Aug. 14, 1956  H. KLAUE  2,758,677
OIL-PRESSURE DISK BRAKE
Filed Dec. 5, 1951
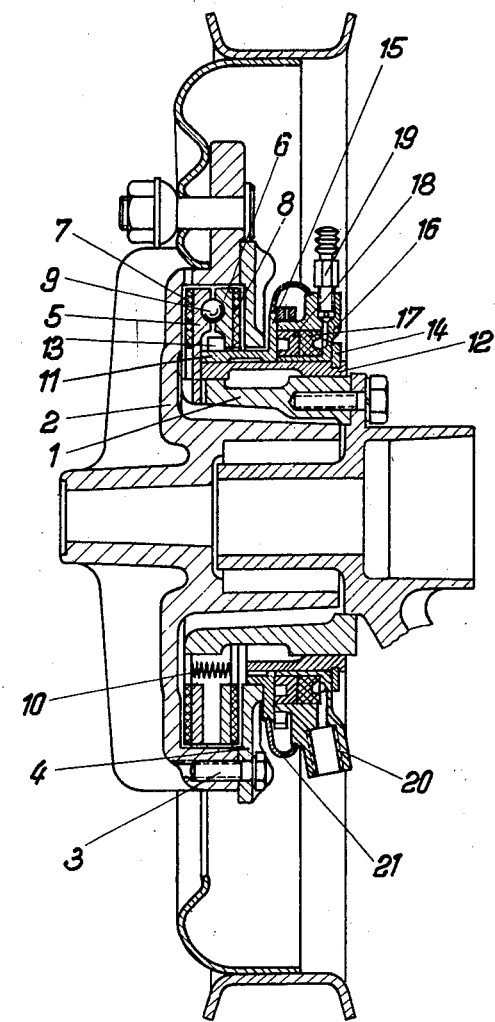
Inventor:
HERRMANN KLAUE
By E. T. Freeman
ATTORNEY.

United States Patent Office 2,758,677
Patented Aug. 14, 1956

2,758,677
OIL-PRESSURE DISK BRAKE

Hermann Klaue, Uberlingen, Germany

Application December 5, 1951, Serial No. 260,031

Claims priority, application Germany January 11, 1951

1 Claim. (Cl. 188—72)

The invention relates to a hydraulically operated disk brake. Disk brakes of this type are known where the disks are provided with a brake lining. These disks are provided at their inner surface with recesses having a bevelled surface wherein the balls rest. By rotating the two disks relatively to each other the balls run up along the bevelled surfaces of the recesses and press the brake disks downwardly in the axial direction against the rotating brake casing. The brake disks may be rotated mechanically relatively to each other. It is also known to hydraulically press the brake disks against the rotating brake casing, the one of the brake disks being freely rotatable and provided with a projection forming an annular piston which is journalled in the other stationary brake disk. The annular piston is tightened by a collar provided with lips. Such brakes have the disadvantage that the said collar must execute a certain rotating movement if the brake is operated, whereby leakage may arise. Besides, the danger of overheating the collar prevails as the heat is directly transmitted by the brake disks.

This disadvantage is eliminated by the disk brake forming the subject matter of this invention, of which a vertical sectional view is shown in the accompanying drawing.

In the drawing numeral 1 denotes a stationary brake carrier and numeral 2 the hub body to which a brake cover 4 is fastened by the screws 3. The hub body 2 together with the brake cover 4 form the rotatable brake casing. The brake carrier projects into this brake casing whereupon the two brake disks 5 and 6 are mounted so as to be displaceable in the axial direction. The disk 5 is provided with the brake lining 7 and the disk 6 with the brake lining 8. Both brake disks 5, 6 are connected with each other by balls 9 resting in recesses provided with bevelled running-up surfaces and uniformly distributed over the circumference. Spring means 10 urge the disks toward each other to retain the balls in the recesses and to keep the same in their neutral position or to return them into said position after the braking procedure has been effected.

A sleeve 11 is connected with the brake disk 5 which is thus prevented from being rotated, but is axially displaceable. The sleeve 11 is displaceably supported on a sleeve 12 which is connected by means of projections 13 with the brake disk 6. At the right hand side of the sleeve 12 a retainer ring 14 is located. Between this ring and the collar 15 of the actuating sleeve 11 a hydraulic ring is provided upon the sleeve 12, said hydraulic ring consisting of a cylindrical portion 16 and a piston forming portion comprising a rubber collar 17 and a pressure ring 18 preferably vulcanized to this collar. Numeral 19 denotes the deaerating screw of the hydraulic unit and 20 the connecting piece for a hydraulic hose, not shown in the drawing. This hydraulic unit is protected against being soiled by a rubber cover 21.

If oil is entered through the connecting piece 20 the sleeve 11 is pressed against the brake disk 5; the projections 13 of the sleeve 12 are pressed against the brake disk 6 and therewith the linings 7 and 8 of the brake disks are pressed against the rotating brake casing 2, 4. Though the brake disk 5 is prevented from rotating, the brake disk 6 may rotate within a certain angle, being driven by the rotating brake casing 2, 4 for a certain amount, i. e. rotated relatively to the brake disk 5. Thereby the balls 9 run along the bevelled running-up surfaces of the recesses within which the balls rest, thereby increasing the braking effect. When the oil-pressure ceases the springs 10 return the brake disks 5, 6 into their inactive position.

What I claim is:

A hydraulically operated disk brake comprising a rotatable casing having parallel internal brake walls, a stationary brake carrier projecting into said casing, a pair of parallel, annular, disks within said casing and mounted on the carrier for movement axially thereof and of the casing, one of the disks being also mounted for limited rotational movement on the carrier, brake linings on the outer surfaces of the disks for cooperation with the adjacent walls of the casing, opposed semicircular recesses in the inner surfaces of the disks, balls in the recesses, spring means urging the disks toward each other to retain the balls in the recesses and to disengage the brake linings from the casing walls, a pair of concentric sleeves axially movable on the carrier and projecting at one end into the casing, an annular cylinder outside the casing and mounted on one sleeve, an annular piston in the cylinder and projecting therefrom into contact with the adjacent end of the other sleeve, said cylinder and piston being operative upon admission of liquid to the space between them to move said sleeves axially in opposite directions, and cooperating means between the ends of the sleeves within the casing and the respective disks for urging the disks axially apart and into contact with the casing walls responsive to said last-named axial movement of said sleeves.

References Cited in the file of this patent

UNITED STATES PATENTS

| 2,063,024 | Bendix | Dec. 8, 1936 |
| 2,256,725 | Pierce et al. | Sept. 23, 1941 |
| 2,375,854 | Lambert | May 15, 1945 |

FOREIGN PATENTS

| 401,638 | Italy | Nov. 1945 |